United States Patent
Weiss

(10) Patent No.: US 6,553,222 B1
(45) Date of Patent: Apr. 22, 2003

(54) METHOD AND SYSTEM FACILITATING AUTOMATIC ADDRESS BOOK ENTRIES WITH CALLER SPECIFIC VOICE IDENTIFIERS AND CALL NOTIFICATION

(75) Inventor: Avi S. Weiss, Santa Clara, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/280,236

(22) Filed: Mar. 29, 1999

(51) Int. Cl.[7] .................................................. H04Q 7/22
(52) U.S. Cl. ........................ 455/415; 455/414; 455/567
(58) Field of Search ................................. 455/412, 414, 455/415, 417, 466, 564, 567; 379/213.1, 214.1, 207.15, 207.16, 67.1, 69, 88.2, 88.17, 373, 374, 211.01

(56) References Cited

U.S. PATENT DOCUMENTS 5,841,837 A * 11/1998 Fuller et al. ............ 379/211.01
5,848,131 A   12/1998 Shaffer et al.

FOREIGN PATENT DOCUMENTS

| EP | 0 812 120 A2 | 12/1997 |
| EP | 0 964 590 A3 | 12/1999 |
| GB | 2 240 693    | 8/1991  |
| GB | 2 327 556    | 1/1999  |
| WO | WO 97/41654  | 11/1997 |

* cited by examiner

Primary Examiner—Lester G. Kincaid
(74) Attorney, Agent, or Firm—Beyer Weaver & Thomas, LLP

(57) ABSTRACT

A method and system which enables two-way mobile communication devices to automatically update and utilize the entries in a resident address book, where the entries are comprised of a personalized greeting from a caller and related information (e.g. automatic number identification (ANI) information). Calls placed to a serviced device are intercepted and processed by a call manager. The call manager extracts the ANI information from the call and determines if the called mobile device has an address book entry for the caller. If it is determined that the caller does not have an address book entry, the caller is prompted to provide a personalized greeting, which is recorded and forwarded with the ANI information to a proxy server device associated with the called mobile device. Upon completion of the above described processing, the called and calling devices are connected (i.e. a voice communication channel is established). The proxy server device processes the received personalized greeting and associated information and forwards it to the destination mobile device through a data communications channel. If it is determined that there is a pre-existing address book entry, then the called and calling devices are connected without further processing.

13 Claims, 7 Drawing Sheets

METHOD AND SYSTEM FACILITATING AUTOMATIC ADDRESS BOOK ENTRIES WITH CALLER SPECIFIC VOICE IDENTIFIERS AND CALL NOTIFICATION

BACKGROUND OF THE INVENTION

Field of the Invention

The present invention relates to two-way mobile communication devices and, more particularly, to a method and system for generating automatic address book entries containing caller specific voice identifiers, which may be substituted for the normal device notification mechanism.

Description of the Related Art

For persons and businesses requiring instant access to information, the Internet and Intranets have provided a vehicle for near real-time delivery of information from an enormous number of sources. For many of those same individuals, two-way mobile communication devices (e.g., cellular phones, two-way pagers, Personal Digital Assistants (PDAs), and handheld computing devices) have provided a means for communicating irrespective of locality. It was only natural for these two exploding mediums to come together in a manner such that two-way mobile communication devices have become one of a plurality of entry vehicles into the Internet and Intranets.

The current generation of two-way mobile communication devices have microprocessors, information storage capability and they run software applications. A popular-type of software application resident on many of these devices is an electronic address book, which provides ready access to contact information of interest.

Generally, a user of such a device views the address book information on a compact display and navigates the information using keys in a phone keypad. If the user is involved in some other task, for example driving a motor vehicle, then the user must divert a percentage of his/her attention away from the task at hand (i.e., driving). A survey by the Insurance Research Council (IRC) found that 84% of surveyed drivers believe that just using a cellular phone while driving is a distraction that increases the likelihood of an accident. Using an address book under similar circumstances would be even more of a distraction.

Generally, the typical user interface associated with two-way mobile communication devices is not convenient for inputting long strings of alphanumeric characters. The input interfaces (e.g., a keypad) and display areas (e.g., an LCD) are small and not very efficient when compared to the input interfaces (e.g., a keyboard) and display areas (e.g., a monitor) of a personal computer.

Giving the user information relating to the identity of the caller would allow the user to better choose whether to answer the call or not. There are numerous automatic number identification (ANI) systems which provide the phone numbers and related information associated with incoming calls (e.g., U.S. Pat. No. 5,841,837 and U.S. Pat. No. 5,848,131). In these methodologies, the phone number is attached as a data field associated with the incoming call. The data field is extracted and displayed on an associated display screen. These methods require the user to look at the display screen to obtain the information, thereby taking their attention away from a collateral task (i.e., driving).

Thus there exists a need for a method and system for improving the efficiency and ease of interacting with a two-way mobile communications device and, more specifically, a method and system for interacting with and utilizing the information associated with an address book having voice augmented information.

SUMMARY OF THE INVENTION

In view of the above, it is one of the objects in the present invention to provide a method and system for facilitating the retrieval and utilization of automatic number identification (ANI) information and a personalized greeting from callers placing calls to serviced two-way mobile communication devices.

According to one aspect of the present invention, an address book resides in a memory of a mobile communications device and comprises entries, each pertaining to personalized greeting from a caller and related information (e.g., ANI information and/or user specified identifiers). Calls placed to a serviced device are intercepted and processed by a call manager. The call manager extracts the ANI information from the call and determines if the called mobile device has a previous address book entry for the caller. If it is determined that the caller does not have an address book entry, the caller is prompted to provide a personalized greeting, which is recorded and forwarded with the ANI information to an intermediate server device (also referred to as aproxy server device herein) associated with the called mobile device. Upon completion of the above described processing, the called and calling devices are connected (i.e., a voice communication channel is established). The proxy server device processes the received personalized audible greeting and associated information and forwards it to the destination mobile device through a data communications channel. If it is determined that there is a pre-existing address book entry, then the called and calling devices are connected without further processing.

According to another aspect of the present invention, the standard call notification mechanism (e.g., the ringer) is replaced with a personalized audible greeting stored in a resident address book. When a call is received, the associated ANI information is used to query the address book for related entries, and if a related entry is found, that entry replaces the devices standard call notification mechanism. If there are no related entries, then the standard call notification mechanism is used.

The advantages of the invention are numerous. Different embodiments or implementations may yield one or more of the following advantages. One advantage of the present invention is that address book entries having displayable and audible components are entered in a resident address book automatically. Another advantage is that the audible portion of the address book entry may be used to replace the standard phone notification thereby providing the user with information relating to the identity of the caller.

Other aspects and advantages of the invention will become apparent from the following detailed description taken in conjunction with the accompanying drawings, which illustrate by way of example, the principles of the invention.

BRIEF DESCRIPTION OF THE DRAWINGS

The present invention will be readily understood by the following detailed description in conjunction with the accompanying drawings, wherein like referenced numerals designate the structural elements, and in which.

DETAILED DESCRIPTION OF THE INVENTION

Figure 1:
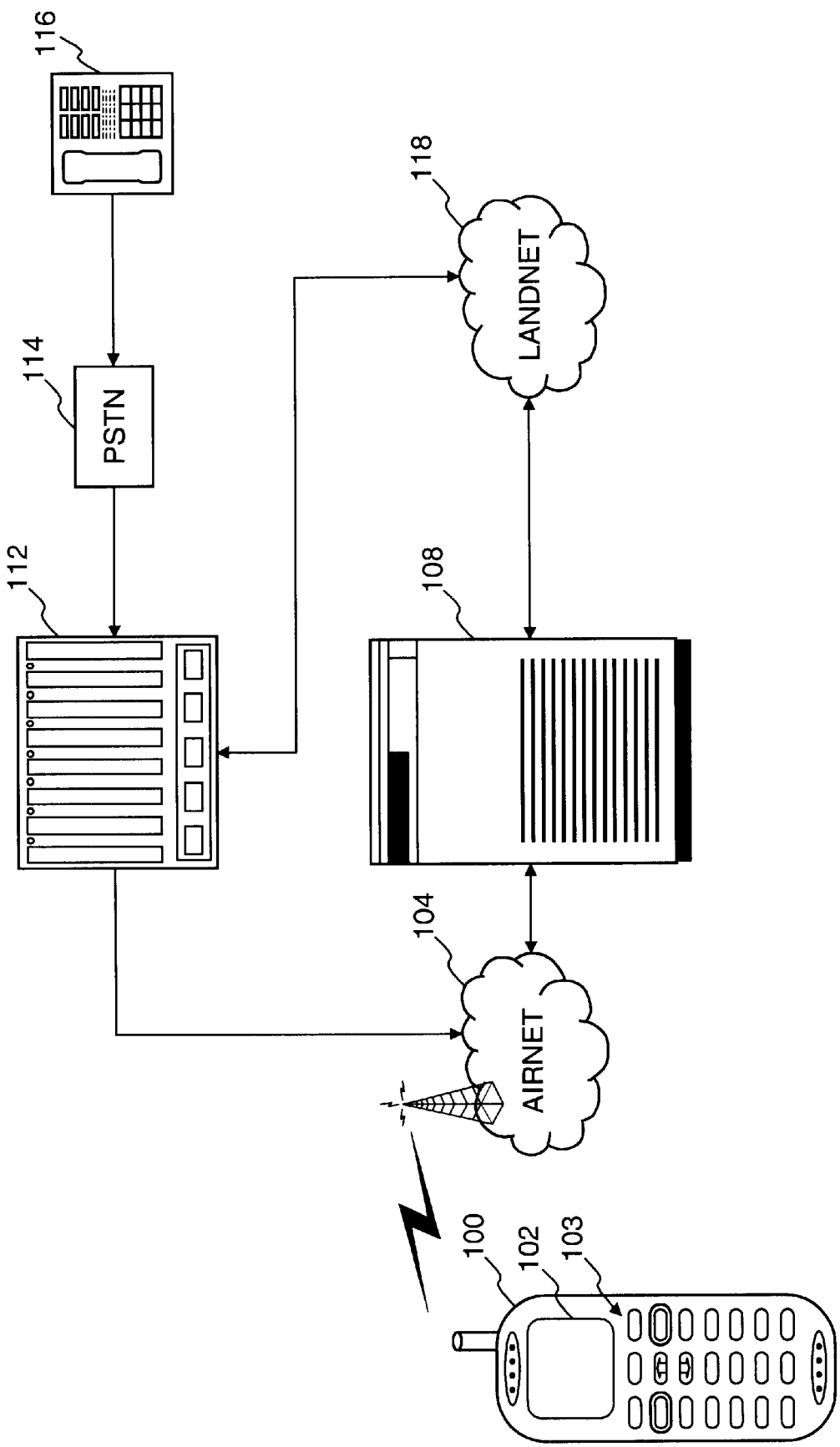
FIG. 1 illustrates a communications system, which may be utilized to practice the present invention.

The invention pertains to systems and methods, which enable two-way mobile communication devices to automatically update and utilize the entries in a resident address book, where the entries are comprised of a personalized greeting from a caller and related information (e.g., automatic number identification (ANI) information). Calls placed to a serviced device are intercepted and processed by a call manager. The call manager extracts the ANI information from the call and determines if the called mobile device has an address book entry for the caller. If it is determined that the caller does not have an address book entry, the caller is prompted to provide a personalized greeting, which is recorded and forwarded with the ANI information to a proxy server device associated with the called mobile device. Upon completion of the above described processing, the called and calling devices are connected (i.e., a voice communication channel is established). The proxy server device processes the received personalized greeting and associated information and forwards it to the destination mobile device through a data communications channel. If it is determined that there is a pre-existing address book entry, then the called and calling devices are connected without further processing.

Additionally, the audible component of previously stored address book entries may be used to replace the standard call notification mechanism (e.g., the ringer) for the called mobile device. The ANI information associated with incoming calls is utilized to query the address book entries for matches, and if a match is identified, the personalized greeting associated with the matched address book entry replaces the standard call notification mechanism.

The two-way mobile communication device, also referred to as two-way interactive communication devices, wireless client devices, and mobile devices, include but are not limited to personal digital assistants, palm-sized computing devices, cellular phones, two-way pagers and wireless capable remote controllers. Such devices typically have significantly less memory and processing capability than is found in desktop and laptop computers. These mobile devices typically have a small display screen and a keypad with a reduced character set, as opposed to the full function keyboards and monitors associated with desktop or laptop computers.

In the following detailed description of the invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the invention.

Embodiments of the invention are discussed below with reference to FIGS. 1–7. However those skilled in the art will readily appreciate that the detailed description given herein with respect to these figures is for exemplary purposes as the invention extends beyond the embodiments discussed below.

To facilitate a description of the present invention, it is deemed necessary to recite some of the features of a communications system in which the invention may be practiced. Referring to FIG. 1 a block diagram of a typical communications system according to one embodiment of the present invention is displayed. Mobile device 100 (e.g., a cellular telephone, a two-way pager, a personal digital assistant, or a palm-sized computer) receives phone calls through a voice communications channel and hypermedia information (e.g., Hyper Text Markup Language (HTML) documents, Compact Hypertext Transport Protocol (cHTML) documents, Extensible Markup Language (XML) documents, Handheld Device Markup Language (HDML) documents, or Wireless Markup Language (WML) documents) from remote server devices through a data communications channel which may include proxy server device 108. Mobile device 100 has a display 102 and a user interface 103. Additionally, mobile device 100 may have a micro-browser (e.g., a micro-browser from Openwave Systems Inc., 1400 Seaport Boulevard, Redwood City. Calif., 94063) stored in a local memory which enables it to process hypermedia information received from remote server devices.

A caller utilizing communication device 116 (e.g., a telephone) to communicate with mobile device 100 dials an access number (e.g., a phone number) associated with mobile device 100 to initiate a communications session (e.g., a phone call). The call is processed by a land based phone system (Public Switched Telephone Network (PSTN) 114) and forwarded to mobile device 100 via call manager 112. Call manager 112 extracts the automatic number identification (ANI) information associated with the call and queries an address book entry storage area dedicated to mobile device 100. If it is found that there is no previous entry for the caller in the dedicated address book entry storage area, then the caller is prompted to provide a personalized greeting to be stored. The ANI information and the stored personalized greeting are forwarded to mobile device 100 via landnet 118, proxy server device 108 and airnet 104. Upon completion of the processing described above, or if a previous entry was identified during the query, then a voice channel is established between mobile device 100 and communication device 116 using airnet 104. Proxy server device 108 processes the received ANI information and the personalized greeting and forwards them to mobile device 100 using a data communications channel also established on airnet 104.

Airnet 104 may be, for example, a cellular digital packet data network (CDPD), a Global System for Mobile (GSM) network, a Code Division Multiple Access (CDMA) network, a Time Division Multiple Access (TDMA) network, a Personal Digital Cellular (PDC) network or a Personal Handy-phone System (PHS) network. The communications protocols used by airnet 104 may, for example, be Wireless Access protocol or Handheld Device Transport Protocol (HDTP).

Proxy server device 108 may be, for example, a SPARC workstation from Sun Microsystems. Inc. Proxy server device 108 acts a bridge between airnet 104 and remote devices connected by landnet 118. It should be pointed out, however, that the functions of proxy server device 108 may be performed by a network server device connected to landnet 118 with hardware well known in the art providing the connection between airnet 104 and landnet 118.

Landnet 118 is a land-based network that may be the Internet, an Intranet or a data network of any private network. Typically the communication protocol supporting landnet 118 may be Transmission Control Protocol (TCP/IP), Hypertext Transport Protocol (HTTP), or Secure Hypertext Transport Protocol (sHTTP).

Mobile device 100 receives the ANI information and associated personalized greeting and stores them in a resident address book (memory). As previously stated, the address book entries are comprised of the personalized greetings from callers and associated information (e.g., ANI information). Once stored, the personalized greeting may be used to replace the call notification mechanism when the ANI information of an incoming call corresponds to an entry in the address book. Additionally, the personalized greeting may be used to annunciate address book entries as a user navigates through a list of entries stored on mobile device 100.

Figure 2:
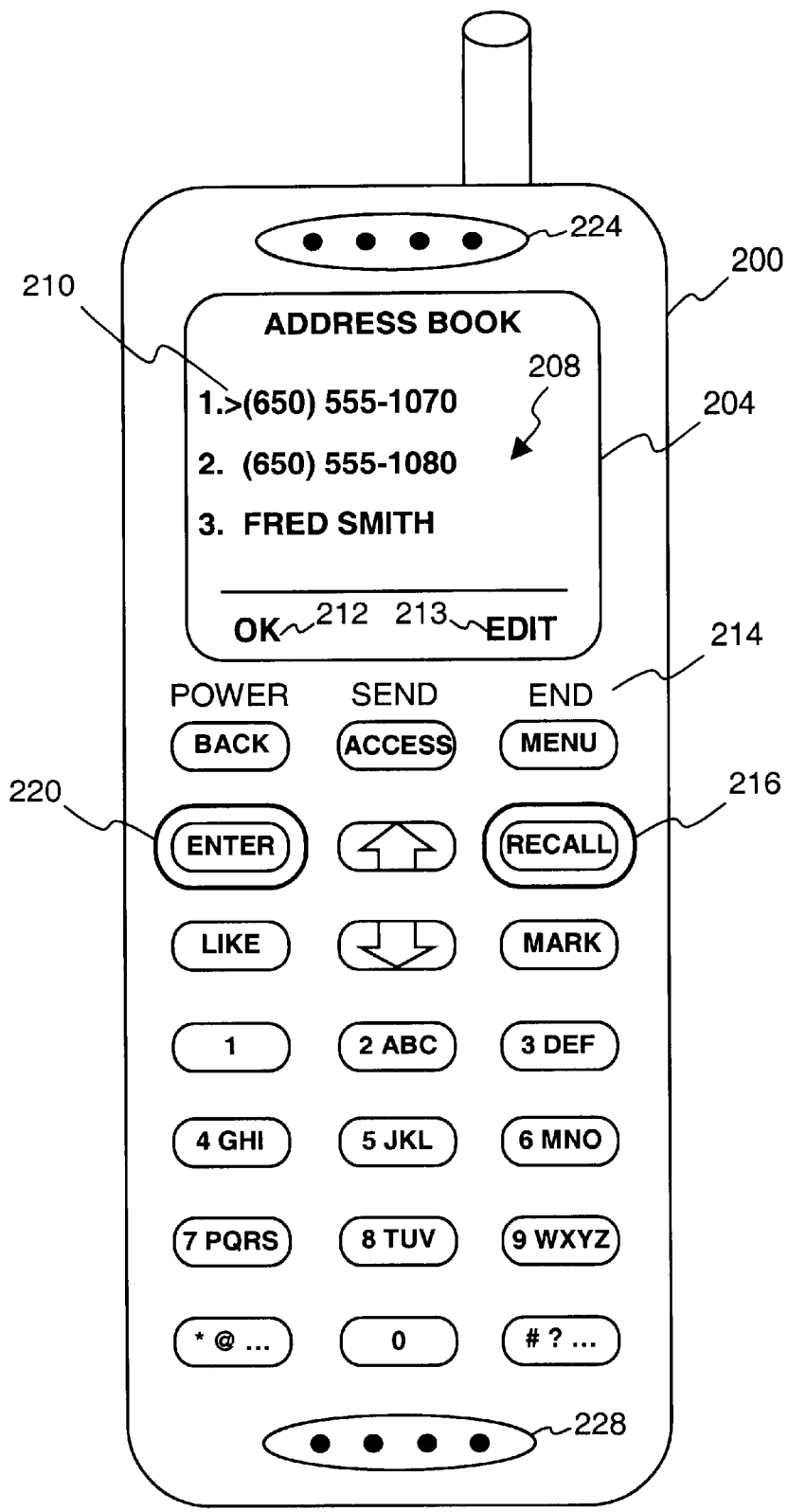
FIG. 2 illustrates a schematic of a two-way mobile communications device according to an embodiment of the present invention.

With reference now to FIG. 2, mobile device 200 (e.g., a cellular telephone, a two-way pager, a personal digital assistant, or a palm-sized computer) comprises a display screen 204, a user interface 214, a speaker 224 and microphone 228. Display screen 204 contains hyper media information 208, a hypermedia selection identifier ">" 210 and softkey identifiers 212 and 214. User interface 214 has function keys (e.g., "MENU", "BACK"), alphanumeric keys, and navigation keys (↑ and ↓). Additionally, function keys 216 and 220 are utilized for soft key inputs.

Hypermedia information 208 is illustrative of an address book, which is stored on mobile device 200. Hypermedia information 208 is comprised of a plurality of selectable identifiers (e.g., phone numbers or alphanumeric identifiers) corresponding to the entries in the address book. The navigation keys (↑ and ↓) are used to navigate the list of selectable identifiers where hypermedia selection identifier ">" 210 indicates the selected item. Associated with some of the selectable identifiers is an audible personalized greeting from a person associated with the identifier. Speaker 224 is used to amplify the personalized greeting when a triggering event occurs. A triggering event may be, an incoming call with matching ANI information, the selection of an identifier with a personal greeting or placing selection identifier ">" 210 next to an item with a personalized greeting.

Figure 3:
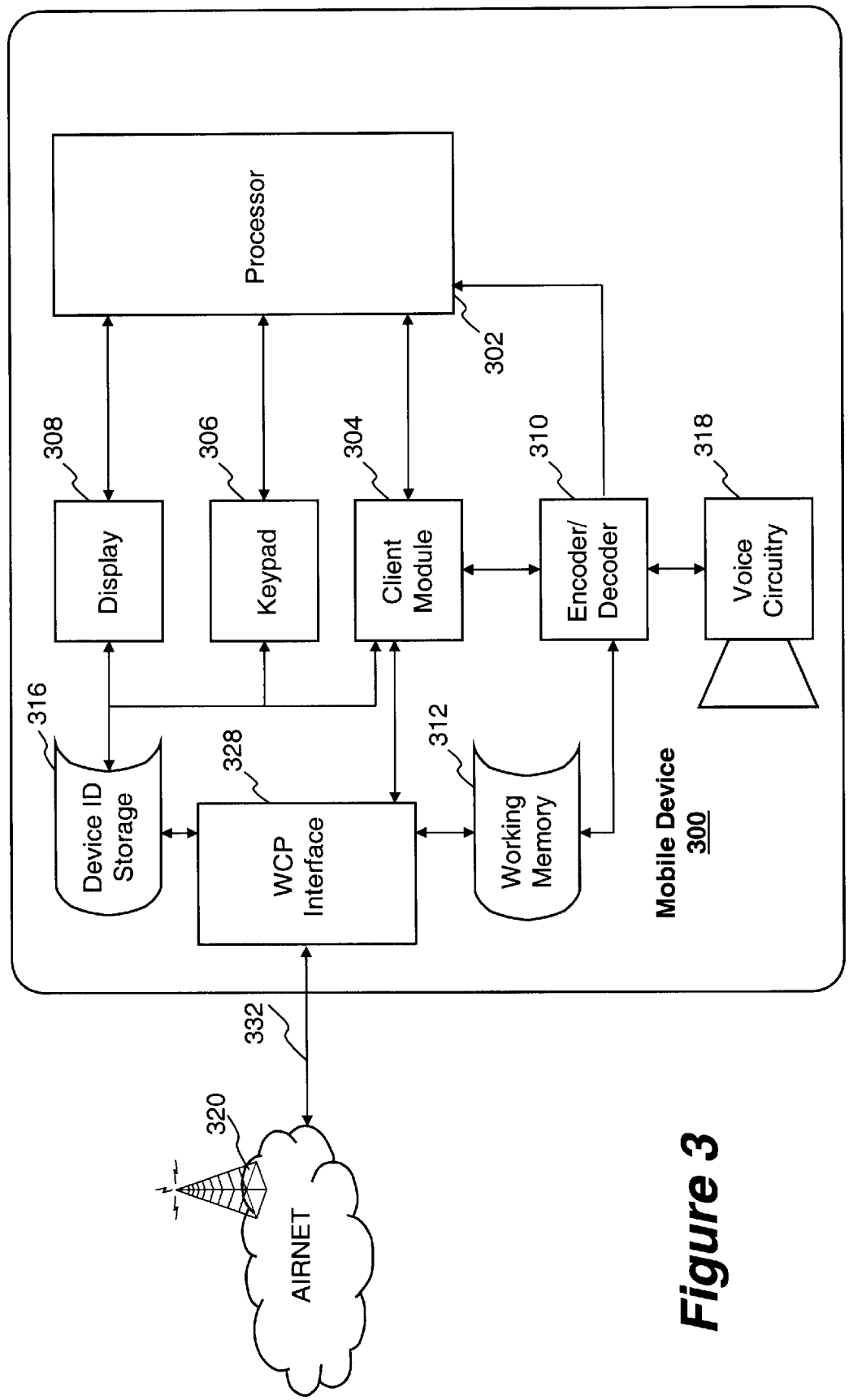
FIG. 3 illustrates a block diagram of the principle components of an exemplary two-way mobile communications device.

Referring now to FIG. 3, a more detailed description of mobile device 300, which may be mobile device 100 of FIG. 1, is provided. Mobile device 300 includes a Wireless Control Protocol (WCP) interface 328 that couples to a carrier network via airnet 320 to receive incoming and outgoing signals. Device identifier (ID) storage 316 stores and supplies a device ID to WCP interface 328 for the purpose of identifying mobile device 300 to outside entities (e.g., proxy server device 108 of FIG. 1). The device ID identifies a specific code that is associated with mobile device 300 and directly corresponds to the device ID in the user account typically provided in an associated proxy server device (e.g., 108 of FIG. 1). In addition, mobile device 300 includes a client module 304 that performs many of the processing tasks performed by mobile device 300 including; establishing a communication session with a proxy server device via airnet 320, operating and maintaining a resident address book, displaying information on a display screen 308 thereof, and receiving user input from keypad 306. The client module 304 is coupled to WCP interface 328 for the establishment of a communication session and the requesting and receiving of data. Additionally, the client module 304 operates, among other things, a browser, commonly referred to as micro-browser, which requires much less computing power and memory than the well-known HTML browser does. The micro-browser may be a micro-browser from Openwave Systems Inc., located at 1400 Seaport Boulevard, Redwood City, calif. 94063.

Figure 4:
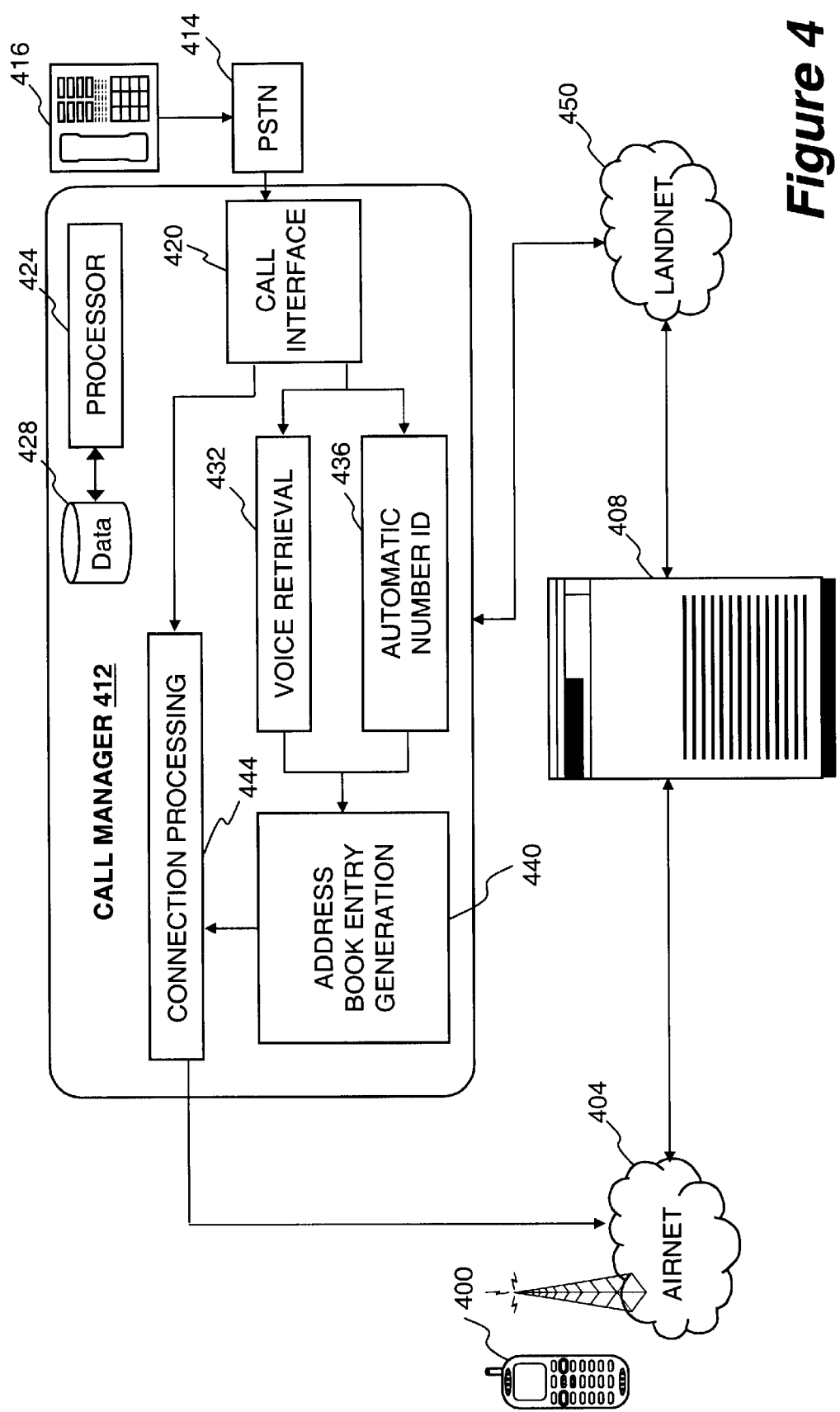
FIG. 4 schematically illustrates the relationship between the call manager and the other system components.

FIG. 4 schematically illustrates the relationship between the call manager 412, which may correspond to call manager 112 of FIG. 1, and the other components of the communications system. It is important to note at this point that the functions of call manager 412 may be incorporated in proxy server device 408 or another device with direct or indirect access to airnet 404. A caller using device 416 (e.g., a telephone) dials a number associated directly or indirectly with mobile device 400 (which may be mobile device 100 of FIG. 1). The call is forwarded to call manager 412 via PSTN 414. Call manager 412 is comprised of call interface 420, processor 424, storage device 428 and software applications which provide functionality relating to the following: 1) ANI information extraction and processing; 2) voice retrieval (e.g., an Interactive Voice Response Unit (WRU)); 3) address book entry processing; and 4) call processing.

The ANI information associated with incoming calls for mobile device 400 is used to query a dedicated database resident on storage device 428 listing previously processed address book entries. If a previous entry exists then the call is processed without further delay. If a previous entry does not exist then the caller is prompted to provide a personalized greeting, which is recorded and temporarily stored in the storage device 428. The recorded greeting, along with the associated ANI information is forwarded to proxy server device 408 through landnet 450.

Figure 5:
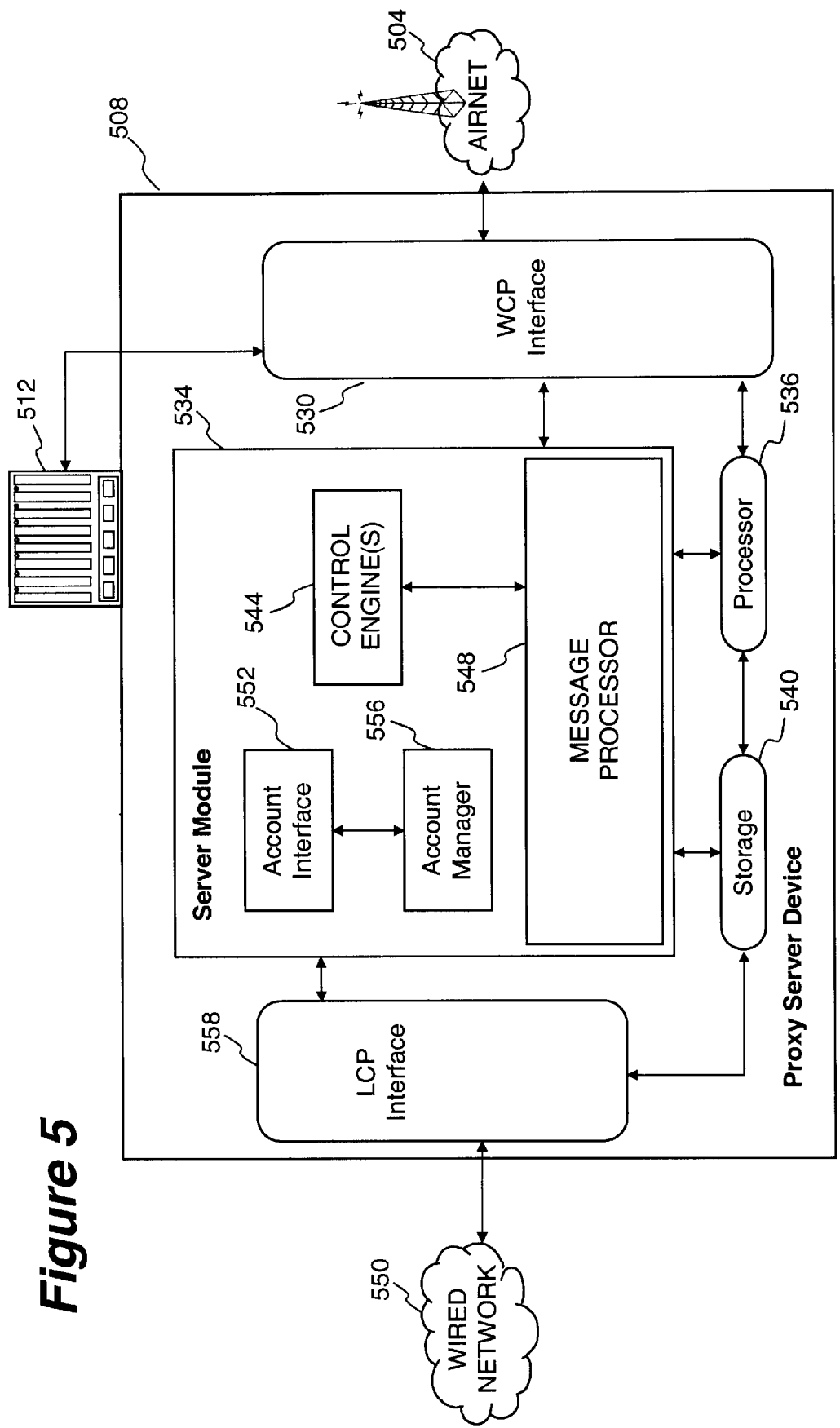
FIG. 5 schematically illustrates the relationship between the proxy server device and the other system components.

Referring now to FIG. 5, the recorded greeting and associated ANI information (also referred to herein as an address book entry) are forwarded to the Land Control Protocol (LCP) interface 558 of Proxy Server Device 508 (which may be Proxy Server device 108 of FIG. 1). The address book entry is further processed by server module 534, where this subsequent processing is related communication protocol differences and content format differences between landnet 550 and airnet 504. Server module 534 is comprised of control engine 544, account interface 552 and account manager 556. Control engine 544 coordinates the exchange of information between mobile devices connected via airnet 504. Account interface 552 and account manager 556 facilitates user specific processing of the received address book entries. The processed address book entry is forwarded to the called mobile device (not shown) via Wireless Control Protocol (WCP) interface 530 and airnet 504 where the entry is processed as previously described.

Figure 6:
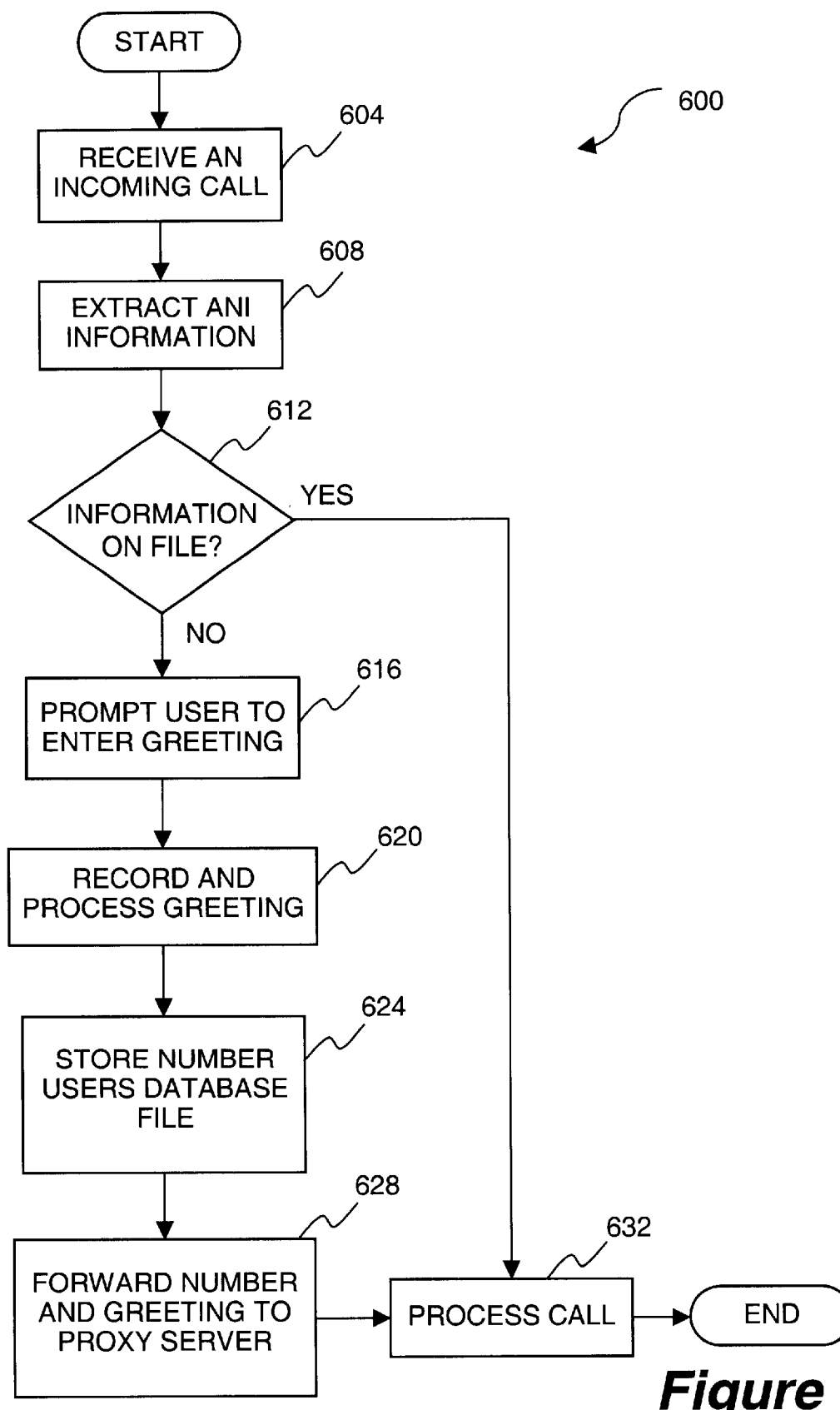
FIG. 6 is a flow chart, which describes call processing by the call manager.

FIG. 6 illustrates a process flow chart which describes the process 600 used by a call manager (e.g., call manager 112 of FIG. 1) to process incoming calls. At 604 an incoming call is intercepted or received and ANI related information is extracted at 608. The extracted ANI information is utilized to query a database relating to previously processed address book entries at 612. If a matching entry is found, then the call is processed without further delay at 632 (e.g., a voice channel between the called and calling devices is established). If no matching entry is found, then the caller is prompted to enter a personal greeting (at 616) which is recorded (at 620). The ANI information (i.e., number) can be stored in the database (at 624). The recorded greeting and associated ANI information are forwarded to the proxy server device at 628. Upon completion of the processing of the address book entry, a voice channel is established (at 632) between the called and calling devices.

Figure 7:
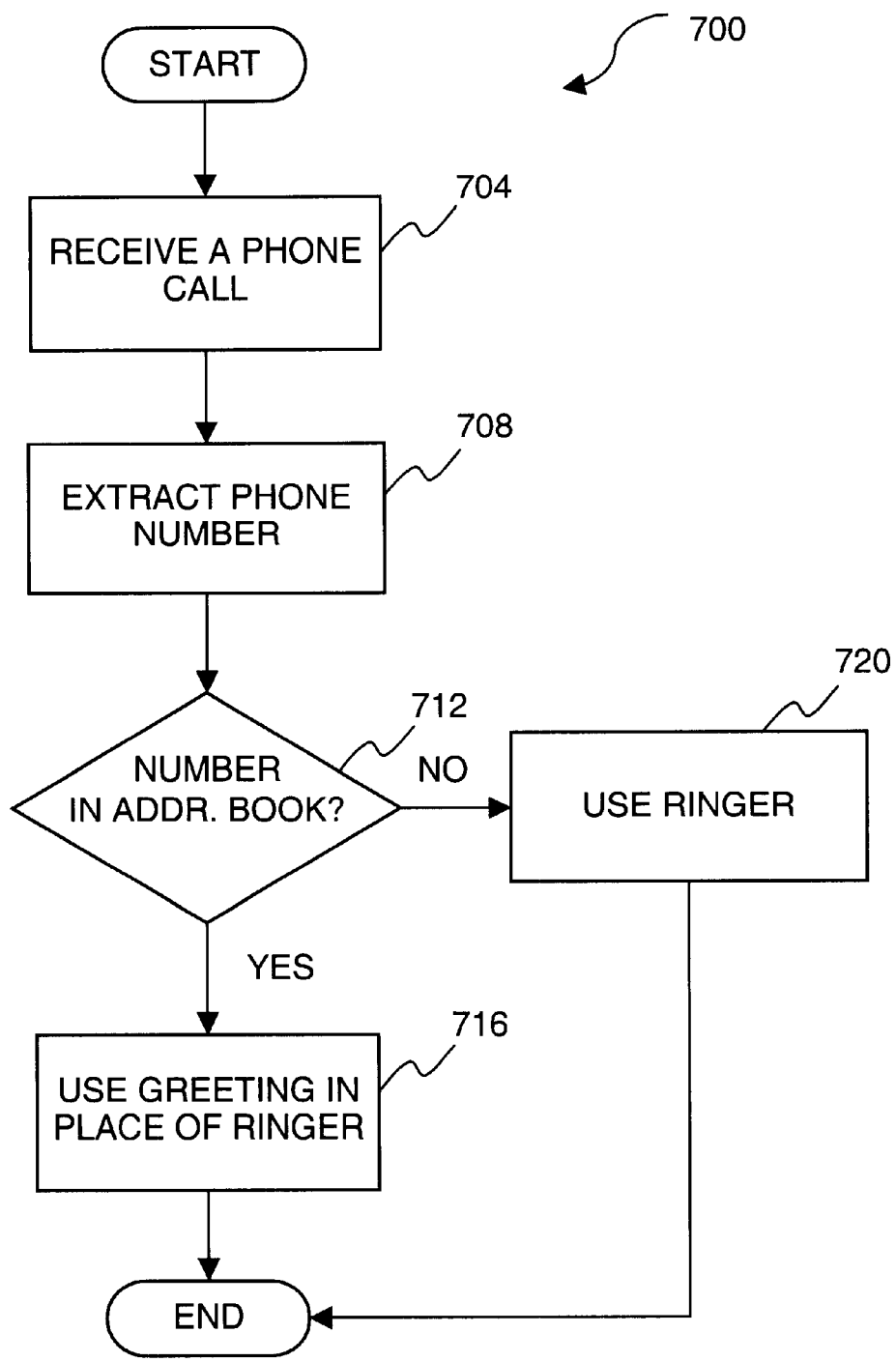
FIG. 7 is a flow chart, which describes call processing by the mobile device.

Referring now to FIG. 7, there is illustrated a process flow chart, which describes the operation of the mobile device in regards to the utilization and processing of address book entries. At 704 a call is received and at 708 any associated ANI information is extracted. The extracted ANI information is utilized to perform a lookup in the resident address book at 712. If a match is found with any of the stored address book entries and there is an associated personal greeting, then that personal greeting replaces the standard call notification mechanism (at 716). If a match and associated personal greeting are not found then the standard call notification mechanism is utilized (at 720).

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of one embodiment.

What is claimed is:

1. A method for automatically processing address book entries for an address book application resident on a two-way mobile communication device, said method comprising:

intercepting a call directed to said two-way mobile communication device;

extracting information relating to the originator of said call;

receiving an audible greeting provided by said originator of said call;

generating an address book entry wherein said address book entry is comprised of said extracted information and said audible greeting; and forwarding said address book entry to said two-way mobile communications device wherein said two-way mobile communications device and a call manager are connected by a landnet using a first communications protocol, an intermediate server device and an airnet using a second communications protocol.

2. The method as recited in claim 1, further comprising:

establishing a voice connection between said two-way mobile communications device and said originator of said call upon generating said address book entry.

3. The method as recited in claim 1, still further comprising:

using said extracted information relating to said originator of said call to search a database of previously generated address book entries;

identifying previously generated address book entries relating to a common originator; and establishing a voice connection between said two-way mobile communications device and said common originator without generating an address book entry.

4. The method as recited in claim 1, wherein said first communications protocol for said landnet is selected from a group consisting of Hypertext Transport Protocol (HTTP) and secure Hypertext Transport Protocol (sHTTP).

5. The method as recited in claim 1, wherein said second communications protocol for said airnet is a wireless protocol.

6. The method as recited in claim 1, wherein said second communications protocol for said airnet is selected from a group consisting of Wireless Access Protocol (WAP) and Handheld Device Transport Protocol (HDTP).

7. The method as recited in claim 1, wherein said address book entry is a markup language file containing displayable and audible components.

8. The method as recited in claim 7, wherein said markup language file is selected from a group consisting of Hypertext Markup Language (HTML), Compact Hypertext Markup Language (cHTML), Extensible Markup Language (XML), Wireless Markup Language (WML) and Handheld Device Markup Language (HDML).

9. The method as recited in claim 1, wherein said extracted information relating to said originator of said call is comprised of Automatic Number Identification (ANI) information.

10. A system for automatically processing address book entries for an address book application resident on a two-way mobile communication device, said system comprising:

a storage device for storing address book entries;

a memory for storing program code for a processor;

a processor coupled to said storage device and said memory, wherein said processor operates to execute said program code stored in said memory to extract information relating to said originator of a received call, prompt said originator of said received call to provide a personalized greeting, generate an address book entry containing at least said extracted information and said personalized greeting, and forward said address book entry to said two-way mobile communications device.

11. The system as recited in claim 10, wherein said address book entry is a markup language file containing displayable and audible content.

12. The system as recited in claim 11, wherein said markup language file is selected from a group consisting of Hypertext Markup Language (HTML), Compact Hypertext Markup Language (cHTML), Extensible Markup Language (XML), Wireless Markup Language (WML) and Handheld Device Markup Language (HDML).

13. The system as recited in claim 10, wherein said extracted information relating to said originator of said received call is Automatic Number Identification (ANI) information.

* * * * *